(12) United States Patent
Filer et al.

(10) Patent No.: US 7,931,537 B2
(45) Date of Patent: Apr. 26, 2011

(54) VOICE INPUT IN A MULTIMEDIA CONSOLE ENVIRONMENT

(75) Inventors: Eric Paul Filer, Renton, WA (US); Wei Guo, Sammamish, WA (US); Edward C. Giaimo, III, Bellevue, WA (US); Hugh Edward McLoone, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 11/165,659

(22) Filed: Jun. 24, 2005

(65) Prior Publication Data

US 2007/0021205 A1    Jan. 25, 2007

(51) Int. Cl.
*A63F 13/00* (2006.01)
(52) U.S. Cl. .............. 463/47; 463/40; 463/46; 455/39
(58) Field of Classification Search .............. 463/35, 463/40–42, 46; 381/26; 462/46
See application file for complete search history.

(56) References Cited

U.S. PATENT DOCUMENTS

| | | | |
|---|---|---|---|
| 5,664,014 A * | 9/1997 | Yamaguchi et al. | 379/430 |
| 6,881,147 B2 * | 4/2005 | Naghi et al. | 463/35 |
| 6,960,137 B2 * | 11/2005 | Nishizawa et al. | 463/35 |
| 7,190,797 B1 * | 3/2007 | Johnston et al. | 381/74 |
| 7,269,452 B2 * | 9/2007 | Cheung et al. | 455/575.6 |
| 2004/0151333 A1 * | 8/2004 | Kral et al. | 381/322 |
| 2005/0003892 A1 * | 1/2005 | Cheng et al. | 463/35 |
| 2005/0018838 A1 * | 1/2005 | Meunier et al. | 379/431 |
| 2006/0025216 A1 * | 2/2006 | Smith | 463/35 |
| 2006/0084504 A1 * | 4/2006 | Chan et al. | 463/39 |
| 2006/0252470 A1 * | 11/2006 | Seshadri et al. | 455/575.2 |

OTHER PUBLICATIONS

"Review: Chat between online players with Game Voice", written by Joel Strauch and posted on Aug. 28, 2000 at http://transcripts.cnn.com/2000/TECH/computing/08/28/game.voice.review.idg/index.html , retrieved on Sep. 22, 2008.*
"The Game Voice Hardware" written by Tim Hsu and posted on Aug. 29, 2000 on http://www.firingsquad.com/hardware/gamevoice/page4.asp, retrieved on Sep. 22, 2008.*
"Speakercom™ for XBox Live™," 2004 http://www/nyko.com/nyko/products/?i=27, 2004.

* cited by examiner

*Primary Examiner* — Ronald Laneau
(74) *Attorney, Agent, or Firm* — Woodcock Washburn LLP

(57) ABSTRACT

Apparatus and methods are provided for enabling a microphone module that connects to a headset jack on a game controller. The microphone may include directional or omnidirectional microphone element(s) that pick up voice input from people near a peripheral, such as a game controller, but reject background sounds from the room. User controls may also be available to set the microphone gain level, either manually or automatically, and/or to mute or unmute the microphone. The microphone of the invention can be used on a wired or wireless game controller. When used with a wireless game controller, wireless microphone capabilities and freedom of movement are provided without headdress requirements imposed by headsets.

3 Claims, 14 Drawing Sheets

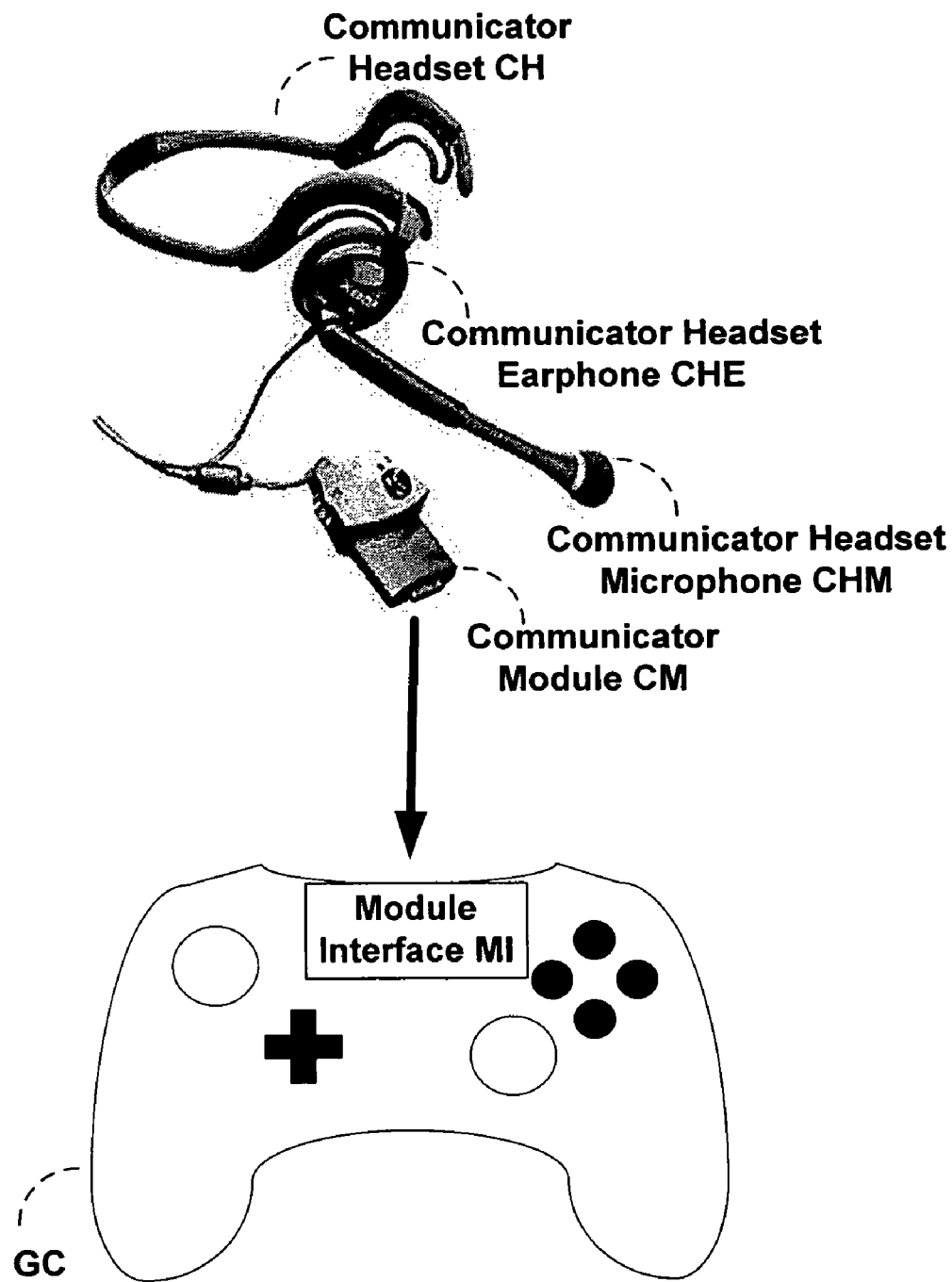
Fig. 1A – Prior Art

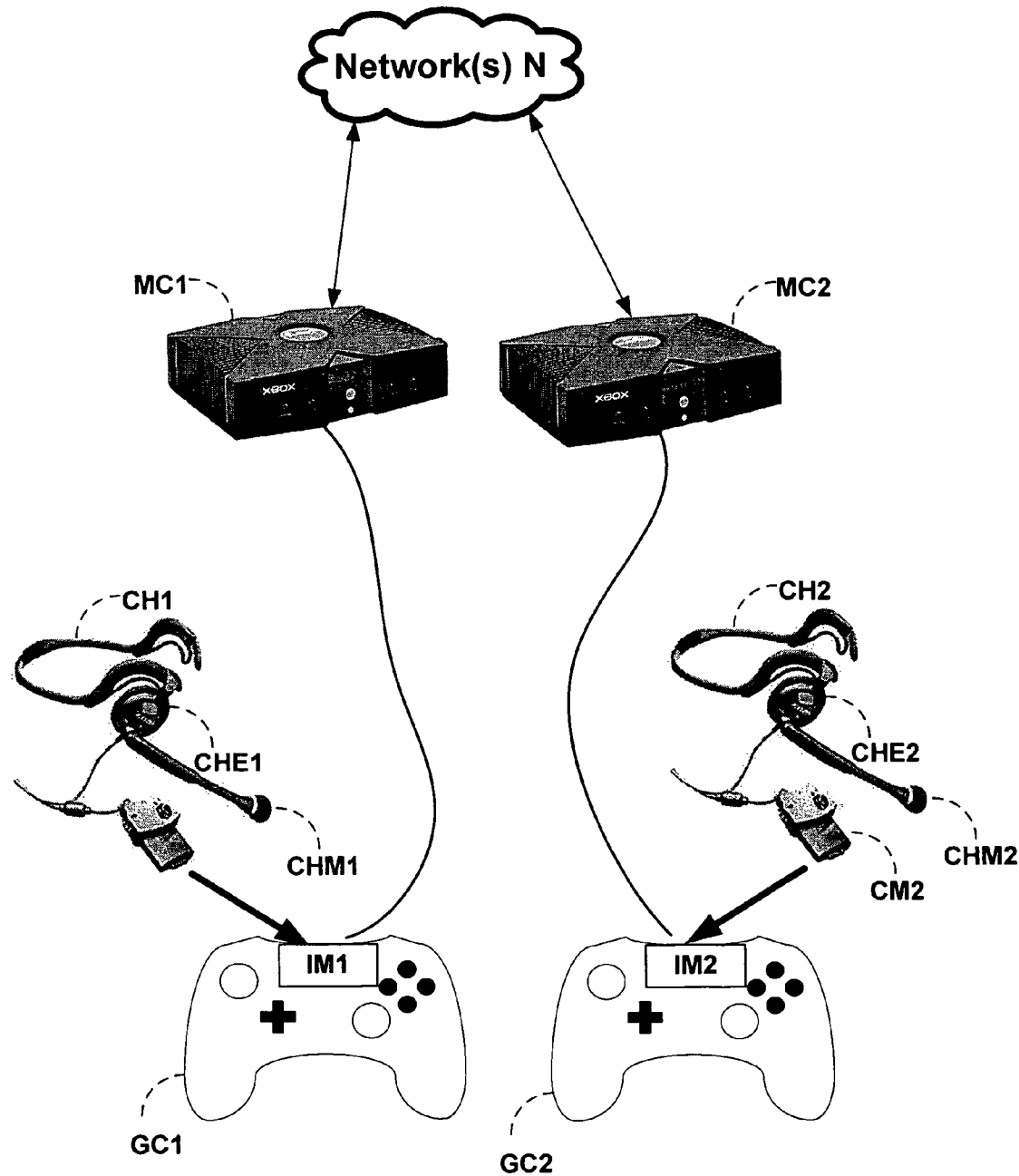
Fig. 1B – Prior Art

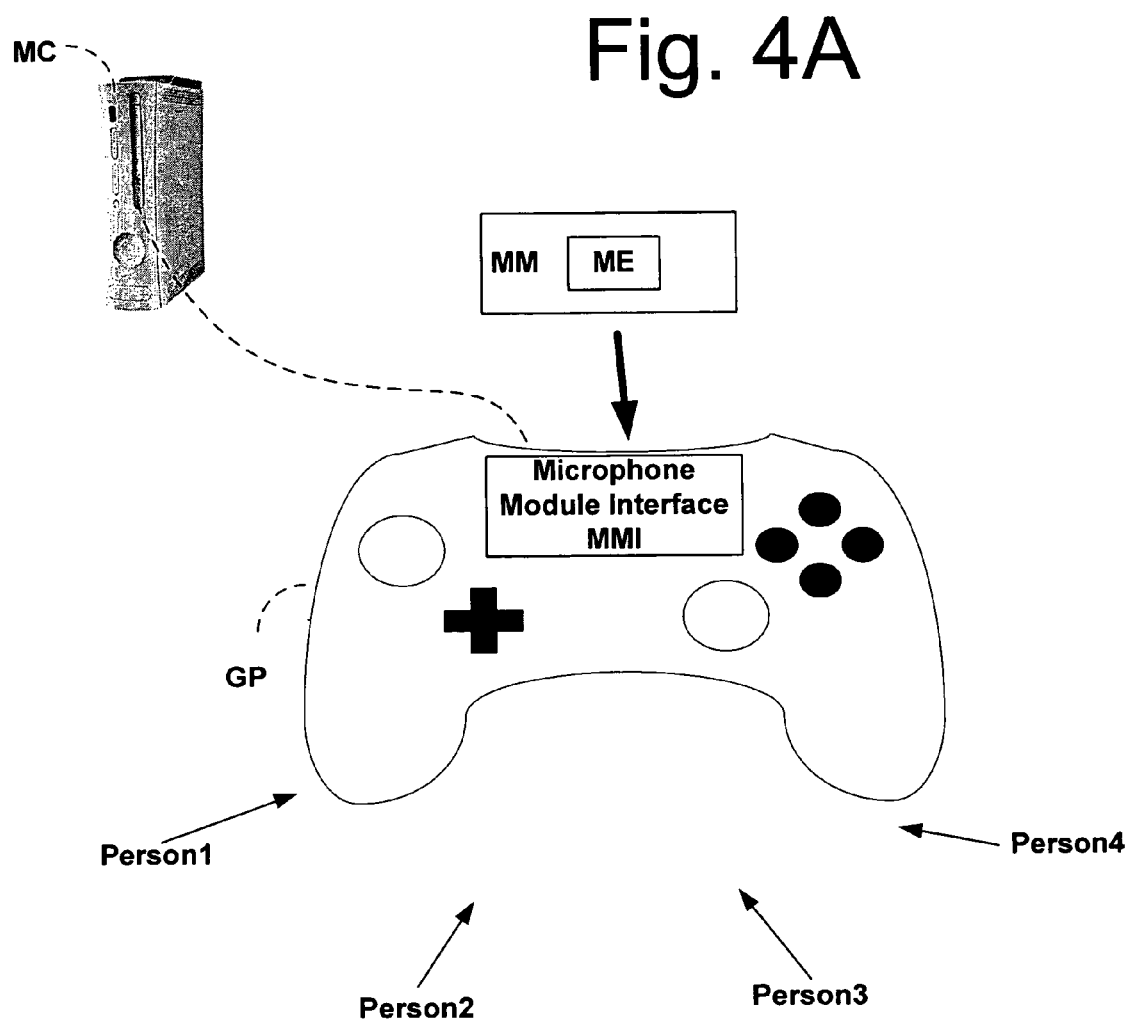

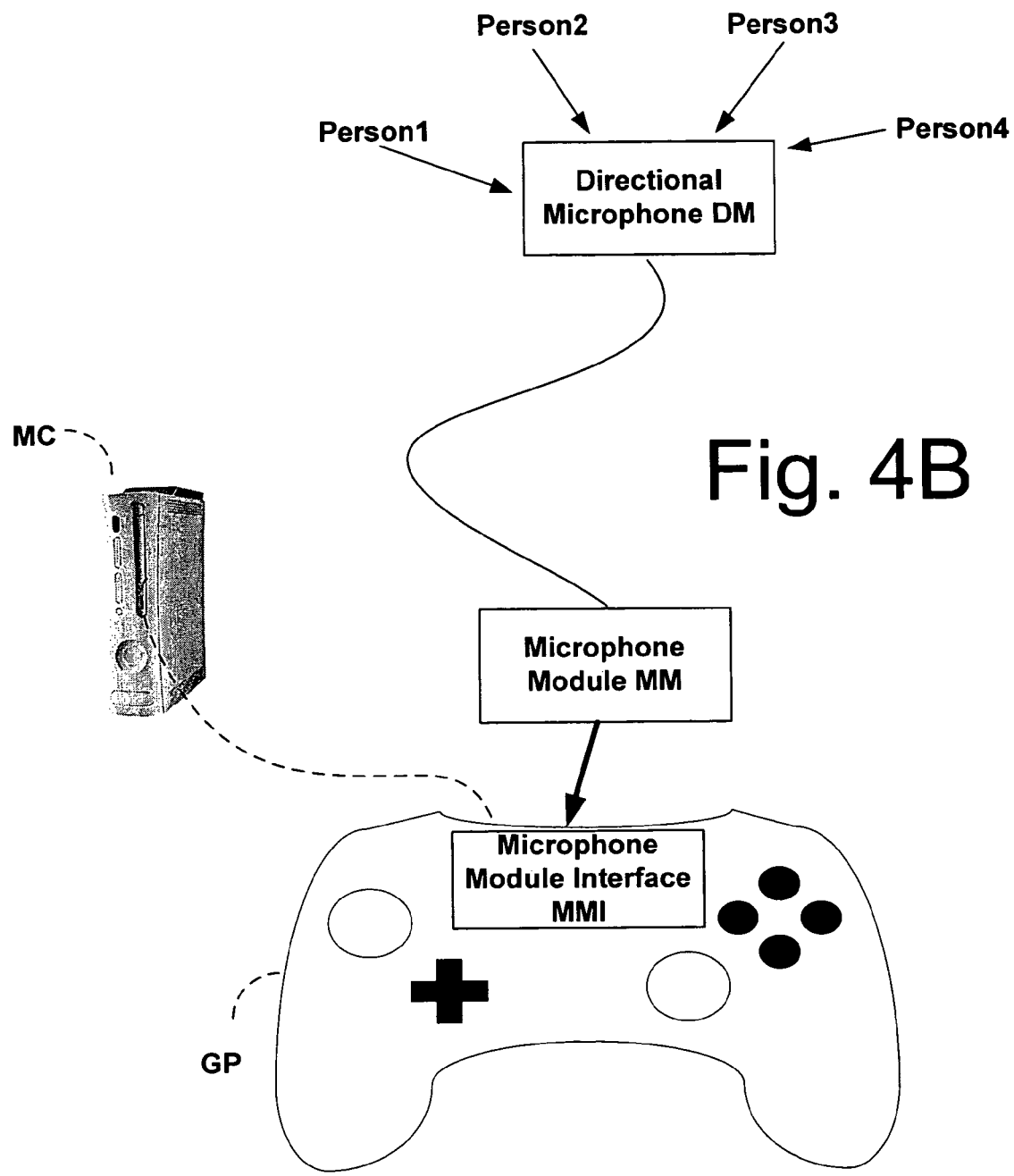

VOICE INPUT IN A MULTIMEDIA CONSOLE ENVIRONMENT

FIELD OF THE INVENTION

This invention generally relates to the provision of a voice input module for use in connection with a peripheral of a multimedia console, such as a game controller. More particularly, the invention relates to the provision of a microphone and corresponding communications module that is connected to or otherwise communicatively coupled to a peripheral for voice input to the multimedia console.

BACKGROUND OF THE INVENTION

By way of background, multimedia consoles, such as video game consoles, historically have functioned principally to play video games, i.e., when a user inserts a game cartridge, DVD, or otherwise loads a game program into the video game console, the video game console responds by engaging the resources of the video game console with the tasks involved in playing the game program. Thus, historically, video game consoles have been primarily dedicated to the task of playing games. In recent years, some video game consoles have evolved to possess functionality beyond the scope of what is strictly a "game." For instance, many game consoles, such as the Xbox® from Microsoft®, can also play music if a music CD is inserted into the console, if the DVD dongle is present, the Xbox can decode and render movie content from DVDs, or if computer content is available or otherwise addressable from the multimedia console, then slideshows, home movies, and the like may be played. With modern consoles, a system screen may be displayed in which a user can change certain settings, engage the music player, etc. A user may also decide to use an application, e.g., the music player, the DVD player, or a game application, whereby the multimedia console operates according to the application's use of the system resources of the multimedia console.

Application environments, such as games and slideshow programs, can thus define the way that input, such as peripheral input from a game controller, is handled upon receipt and the way that output, such as video and audio, is rendered. Application environments take advantage of the system resources and services offered by the multimedia console when defining input and output characteristics for the associated application. One such service offered by and enabled for some multimedia consoles is an on-line networked game experience. With such on-line game experiences, applications can take advantage of a system infrastructure for playing on-line games that allows users to interact with users of any other multimedia console in the world connected to the on-line network. In this respect, a game revolution has occurred because users are no longer required to be co-located to play with one another, and thus can play with one another wherever networked multimedia consoles are available.

The evolution to on-line games and other on-line applications via a multimedia console, however, has created a new need with respect to peripheral input for multimedia consoles. In particular, it became desirable for on-line applications to support talking with one another as an additional function when the players are not co-located. Before on-line games, one could talk to other players simply by talking since all of the players were, by definition, connected to the same multimedia console and thus in the same room. With the evolution of on-line games, headsets began accompanying game controllers by plugging into a headset jack located on the game controllers. Such headsets generally include earphones for receiving voice from other players, and a microphone for transmitting voice to other players.

Generally, such headset voice input is currently handled according to the application environment instantiated for the multimedia console system, and the usual on-line game case is that such voice input is sent from the microphone of the headset to the multimedia console via the game controller, sent via a network to other multimedia consoles where other on-line players may be, and then transmitted to the other users' headset earphones via their respective game controllers. The application environment can define other ways of handling voice input as well, though the usual case is to pass the voice input from the microphone at which it is received to the earphones of other on-line gamers via the network experience.

For instance, as shown in FIG. 1A, voice input on Xbox® is currently provided by an electronic communicator module CM to which a communication headset CH is connected, and which itself plugs into the game controller GC. The communication headset CH includes a communicator headset microphone CHM and communicator headset earphone(s) CHE, and is most appropriate for individual use, where communication occurs person-to-person, e.g., through the Xbox Live® service. As mentioned, in scenarios where a group of people wish to share a voice connection, each one must have their own headset connected to their own game controller. As illustrated in FIG. 1B, for two people to currently interact via multimedia consoles MC1 and MC2 over network(s) N, each person, respectively, must have a game controller GC1 or GC2, an interface module IM1 or IM2, a communicator module CM1 or CM2, and a communicator headset CH1 or CH2 including a communicator earphone CHE1 or CHE2 and a communicator headset microphone CHM1 or CHM2. Similarly, for eight players, eight sets of headsets and controllers must be available—one set for each player.

A better result would be if it were possible to enable the pickup of voice from an entire group of people co-located at a multimedia console, so that communication may be from user(s) to user(s) on a multimedia console to multimedia console basis, rather than a headset to headset, or person to person, basis.

Secondarily, current headsets have inherent limitations for individual use. For instance, headsets take time to put on and off, are often uncomfortable to wear for long periods, interfere with eye glasses, ear rings, hair styles and even comfortable sitting postures that rest one's head against a cushion, or the like. Accordingly, apparatus and methods that address the above-identified shortcomings of headsets and communicator modules on a per person basis are desirable. It would thus be desirable to provide voice input for application environments of a multimedia console in a manner that avoids the above-identified deficiencies associated with headsets.

SUMMARY OF THE INVENTION

The invention relates to apparatus and methods for enabling a microphone module that connects to a headset jack on a peripheral, such as a game controller. In various non-limiting embodiments, the microphone of the invention includes a directional microphone element that picks up voices from people near a peripheral, such as a game controller, but rejects background sounds from the room, though an omni-directional microphone element may be utilized as well. In other embodiments, user controls are available to set the microphone level, either manually or automatically, and/or to mute or unmute the microphone. The microphone of the invention can be used on a wired or wireless game controller.

When used with a wireless game controller, wireless microphone capabilities and freedom of movement are provided without headdress requirements imposed by headsets.

Additional features of the invention will be apparent with reference to the accompanying drawings and the following description of illustrative embodiments of the invention.

BRIEF DESCRIPTION OF THE DRAWINGS

The foregoing summary, as well as the following detailed description of illustrative embodiments, is better understood when read in conjunction with the appended drawings. For the purpose of illustrating the invention, the drawings show illustrative embodiments of the invention; however, the invention is not limited to the specific methods and instrumentalities disclosed in the drawings, in which:

FIGS. 1A and 1B illustrate various prior art systems that provide voice input capabilities in connection with multimedia console on-line game applications;

FIGS. 4A, 4B, 4C, 4D and 4E are exemplary block diagrams of embodiments of the microphone module provided in accordance with the invention;

DETAILED DESCRIPTION OF ILLUSTRATIVE EMBODIMENTS

Figure 2:
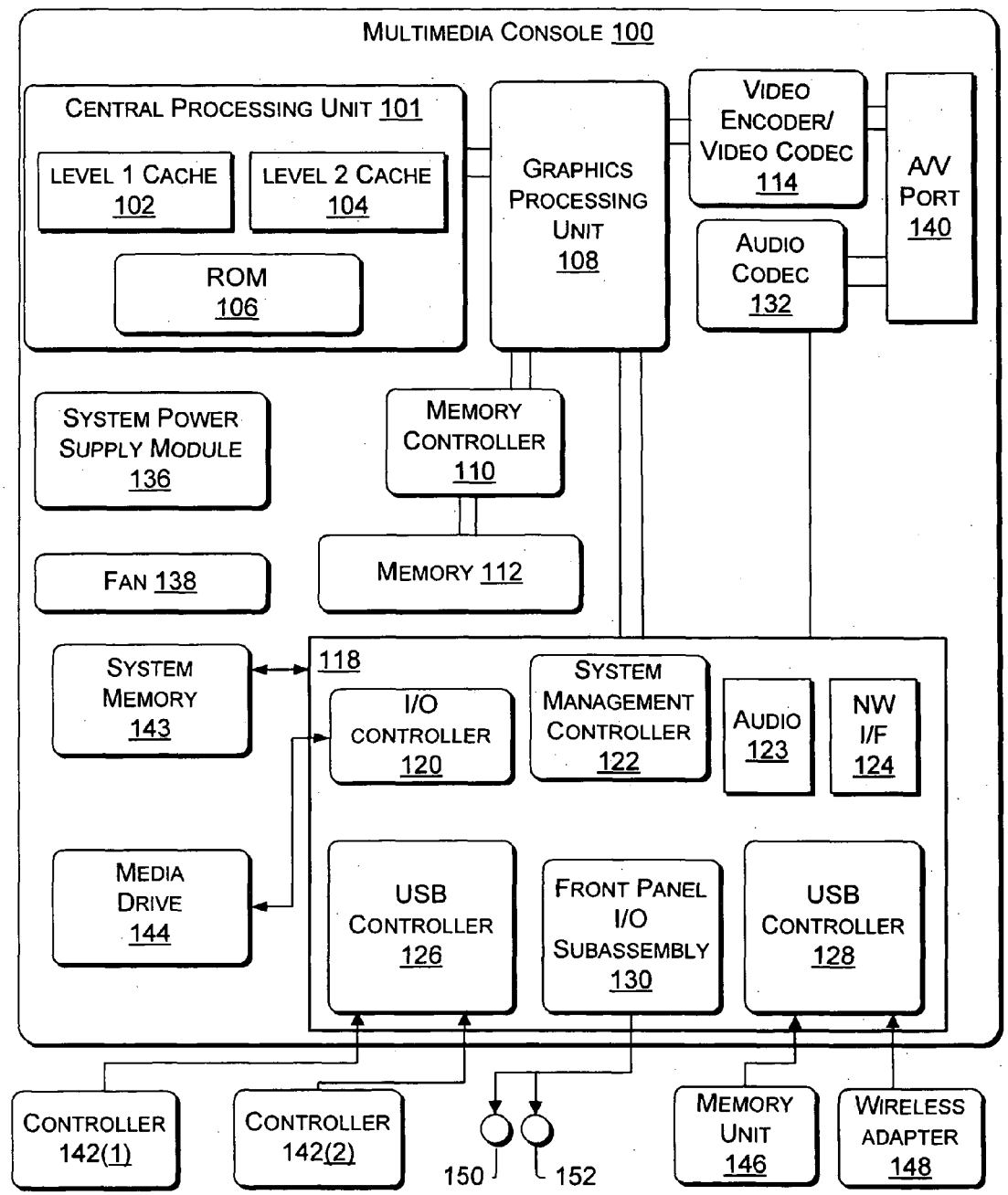
FIG. 2 is a block diagram showing an exemplary multimedia console, in which aspects of the invention may be implemented.

Referring first to FIG. 2, shown is a block diagram illustrating an exemplary multimedia console, in connection with which aspects of the invention may be implemented. FIG. 2 shows the functional components of a multimedia console 100 in which aspects of the invention may be implemented. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

Figure 3:
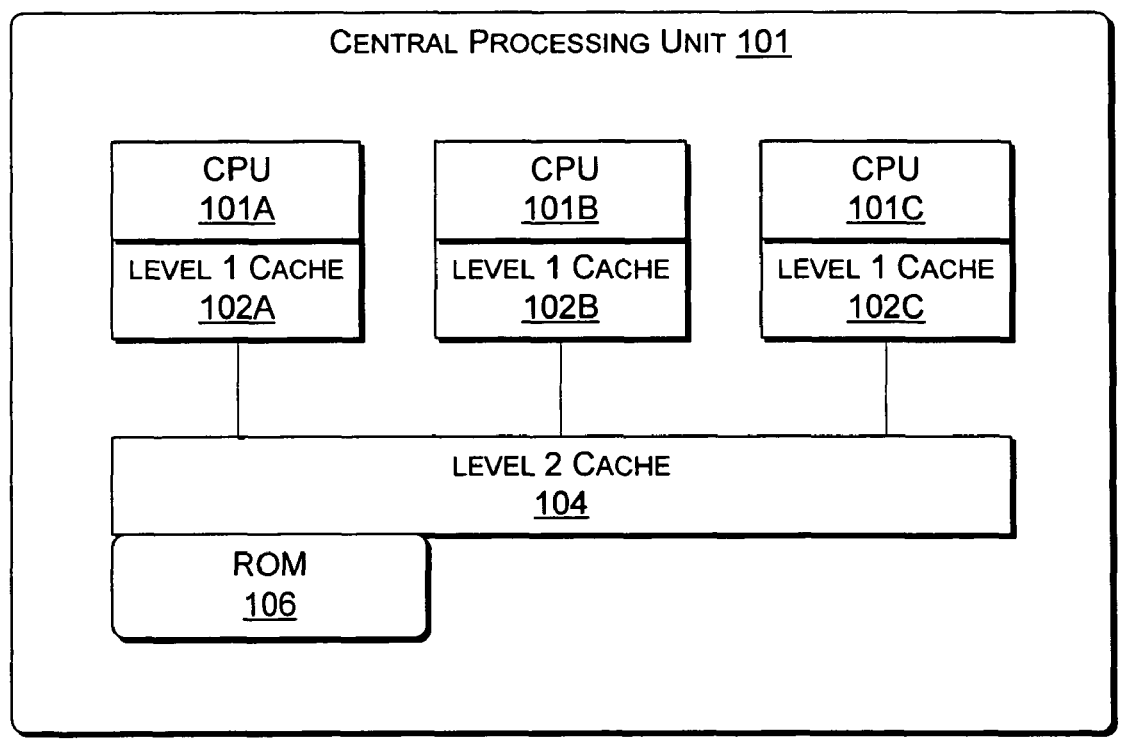
FIG. 3 is a block diagram showing further details of the exemplary multimedia console of FIG. 2, in which aspects of the invention may be implemented.

Referring next to FIG. 3, shown are further details of the exemplary multimedia console of FIG. 2. As shown in FIG. 3, CPU 101 comprises three CPUs: CPU 101A, CPU 101B, and CPU 101C. As shown, each CPU has a corresponding L1 cache 102 (e.g., L1 cache 102A, 102B, and 102C, respectively). As shown, each CPU 101A-C is in communication with L2 cache 104. As such, the individual CPUs 101A, B, and C share L2 cache 104. Because L2 cache 104 is shared between multiple CPU's, it may be complex to implement a technique for reserving a portion of the L2 cache for system applications. While three CPUs are illustrated, there could be any number of CPUs.

The multimedia console depicted in FIGS. 2 and 3 is a typical multimedia console that may be used to execute a multimedia application, such as, for example, a game. Multimedia applications may be enhanced with system features including for example, system settings, voice chat, networked games, the capability of interacting with other users over a network, e-mail, a browser application, etc. Such system features enable improved functionality for multimedia console 100, such as, for example, players in different locations can play a common game via the Internet.

Also, over time, system features may be updated or added to a multimedia application. Rather than requiring the multimedia developer to make significant modifications to the multimedia application to provide these system features, the systems and methods described herein allow a multimedia developer to provide system features through separate system applications that work in conjunction with the multimedia application. For example, a system application may embody functionality related to networked capabilities, thereby enabling a multimedia application to be readily adapted to provide networked capabilities with little work by the multimedia (e.g., game) developer. The system level user interface of the invention can expose all such system level functionality to the user as it exists today, and as may be desirable to expose to the user in the future.

Voice Input Microphone for Use with Multimedia Console Peripheral

In accordance with the invention, voice input capability is provided for a peripheral, such as a game controller, of a multimedia console, such as the exemplary multimedia console environments described in FIGS. 2 and 3. In various non-limiting embodiments of the invention, a directional microphone is provided in a microphone module that connects to, or is otherwise communicatively coupled to, a peripheral such as a game controller. An omni-directional microphone may also be utilized. In various embodiments, the microphone module includes the optional abilities for a user to perform any one or more of the following: to adjust gain of the microphone elements of the microphone module, either manually or automatically, to mute or unmute the microphone module with an indicator showing status of mute, to select a "chatting with others" mode or "giving voice commands to the application" mode, to "pass-through" the microphone module when connecting a traditional headset and to mute the microphone element(s) in the microphone module automatically, and to activate the microphone module automatically when a user speaks, e.g., via a voice operated transmit (VOX) circuit.

In an exemplary, non-limiting embodiment of the invention illustrated in FIG. 4A, microphone elements are mounted in a small plastic housing or microphone module MM that plugs into a peripheral GP, such as a game controller, via a connector to microphone module interface MMI. In one non-limiting embodiment, one or more microphone element(s) ME are provided in microphone module MM that are sensitive enough to handle normal levels of human voice generally in the exemplary, non-limiting range of about 0.3, meters to 1.5 meters from the microphone element(s) ME. In other non-limiting embodiments, the frequency response of the microphone elements ME is pre-arranged to be suitable for a range of human voice frequencies generally in the range of 300-4000 Hz. Moreover, the filter response of the microphone module MM is such that frequencies roll off substantially above the voice range, e.g., greater than 4000 Hz, which achieves better noise cancellation of high frequency noise considered to be outside the range appropriate for human voice. For any of the embodiments described herein, the connection between peripheral GP and multimedia console MC may be achieved via any wired or wireless methods for transmitting peripheral data to the multimedia console MC.

With the microphone module MM connected to the microphone module interface MMI of the peripheral GP, the microphone module MM operates to capture voice input from any user within a reasonable range from the microphone module MM. In various embodiments, the microphone module includes the optional ability for a user to adjust the gain of any of the microphone elements of the microphone module, either manually or automatically. The gain of the microphone module MM may work according to different levels for different application environments of a multimedia console, and accordingly, empowering the user to manually set the gain of the microphone according to the application environment is desirable. In other cases, the application environment may be well suited to a pre-set gain, or even be well suited to a dynamically set gain according to the state or current condition of the application environment according to predetermined algorithms that apply to the application environment. Also, the interface module or microphone module, the peripheral or the multimedia console may include intelligence to determine based on the signal characteristics received whether or not a microphone module according to the invention is present. The signal characteristics of a headset may differ from the characteristics of a directional microphone element, for instance, and so the invention includes the ability to automatically set the gain levels of a connected microphone based on whether it is provided according to the microphone module embodiments of the invention or the microphone of a traditional headset.

Any automatic gain control (AGC) applied in accordance with the invention can be implemented in the microphone module MM (i.e., in hardware), in the game controller (as firmware) or in the multimedia console itself (software), and/or with any combination of the foregoing. It should also be noted that if voice recognition techniques are supported in connection with the voice input techniques for a game controller in accordance with the invention, such voice recognition techniques may preferably be implemented as software in the multimedia console itself, though such techniques may also be implemented as firmware in the game controller.

In other embodiments, a user is given the ability to mute or unmute the microphone module MM, along with an indicator showing the status of mute. User(s) of the microphone module MM may wish to shield their voice temporarily from players that are not currently co-located with the user(s), and thus may find the ability to mute the microphone along with clear indication of status of whether the microphone module MM is muted, e.g., via a light emitting diode (LED), display, etc. on the peripheral GP, on the microphone module MM, on the console MC, or via the screen output from the MC. Such functionality may be enabled via a mute control, such as a mute button, with a clear visual indication delivered to the user(s), e.g., on the peripheral, on the microphone module MM, on the console, or on-screen when mute is on and/or off. Thus, such mute control and corresponding visual cue allows the players co-located in a single room to speak to one another without fear that another remote on-line player may listen in on the conversation.

In other embodiments, the invention provides the ability to select a "chatting with others" mode or "giving voice commands to the application" mode. In the chatting with others mode, users chat with other on-line players via the microphone module MM, and the voice input is received by the multimedia console MC, and transmitted to other on-line players via their respective equipment. In "giving voice commands to the application" mode, certain pre-defined voice patterns may have been pre-programmed according to the application environment of the multimedia console MC to assign functional meaning to receipt of such pre-defined voice patterns. Since the processing for pre-defined voice patterns to determine functional meaning to the application environment involves different processing than for when the voice input is passed to other on-line users, the separate modes enable more efficient processing of voice input data according to the mode that is selected.

In still further other embodiments, the invention provides the ability to activate the microphone module MM automatically when a user speaks, e.g., via a VOX circuit, so that unnecessary power and processing is not wasting processing merely background noise when users of the microphone module MM are not talking. In the case of the microphone module MM of the invention, the VOX is a circuit that operates to control the operation of microphone module MM so that sound input need only be processed when voice input is received.

Figure 4C:
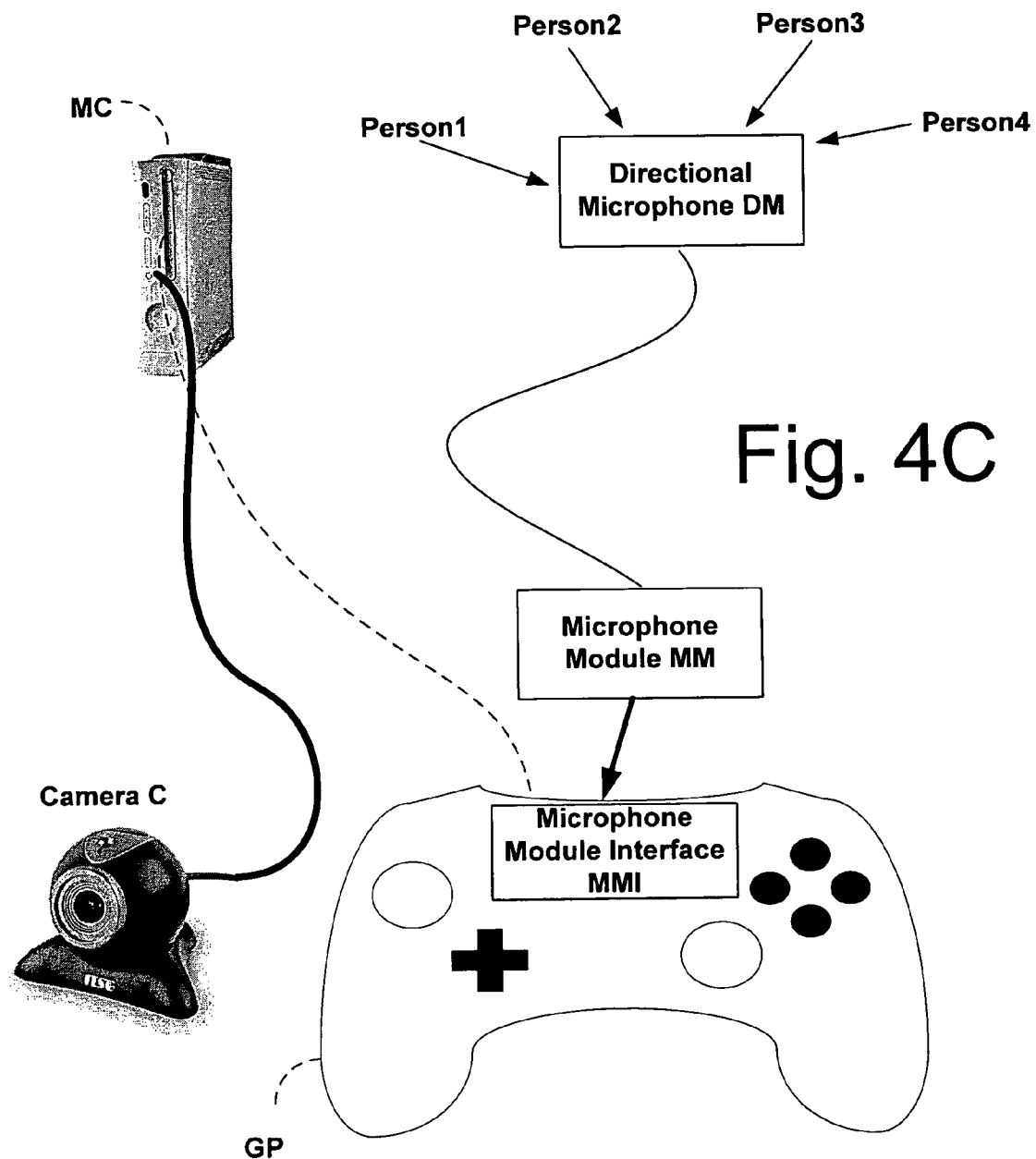

Various other embodiments of the microphone module MM in accordance with the invention are illustrated in FIGS. 4B to 4E. FIG. 4B is an exemplary block diagram of an alternate embodiment of the microphone module MM of the invention in which the microphone elements are separated from, but communicatively coupled to via any wired or wireless means, the portion of the microphone module MM that physically connects to the peripheral GP. In such an embodiment, the functionality offered by the peripheral GP itself may be unimportant, and thus the microphone elements of a directional microphone DM may be housed separately from the peripheral GP and placed on a resting surface as a standalone microphone for multiple users and their voice input.

As mentioned, the microphone does not necessarily need to be directional in accordance with the invention, but rather may also be omni-directional. An observed tradeoff is that an omni-directional microphone can pick up a person's voice better if the person gets up and moves around the room while talking (e.g., for a slideshow), with the downside that the microphone will also pick up other noise (such as people talking in the background or music playing). A unidirectional microphone, in contrast, is more focused in its sound pickup, which helps to diminish the negative effects of background noise. In one embodiment, both an omni-directional microphone and directional microphone are included to allow the user to switch depending upon the application for which the controller is being used.

For specialized application environments that may implicate camera functionality, embodiments of the invention illustrated in FIG. 4C are contemplated wherein a camera C may be somehow connected to or integrated with the multimedia console MC, and wherein it may be desirable to simultaneously engage the camera C and the microphone module MM while witnessing the output of another camera of another multimedia console and hearing the audio of another user, and vice versa. Thus, in such an embodiment, the invention enables freedom of movement for users engaging in multi-party Web cam experiences that are substantially synchronized to the voice input arising from the respective Web cam environments.

Figure 4D:
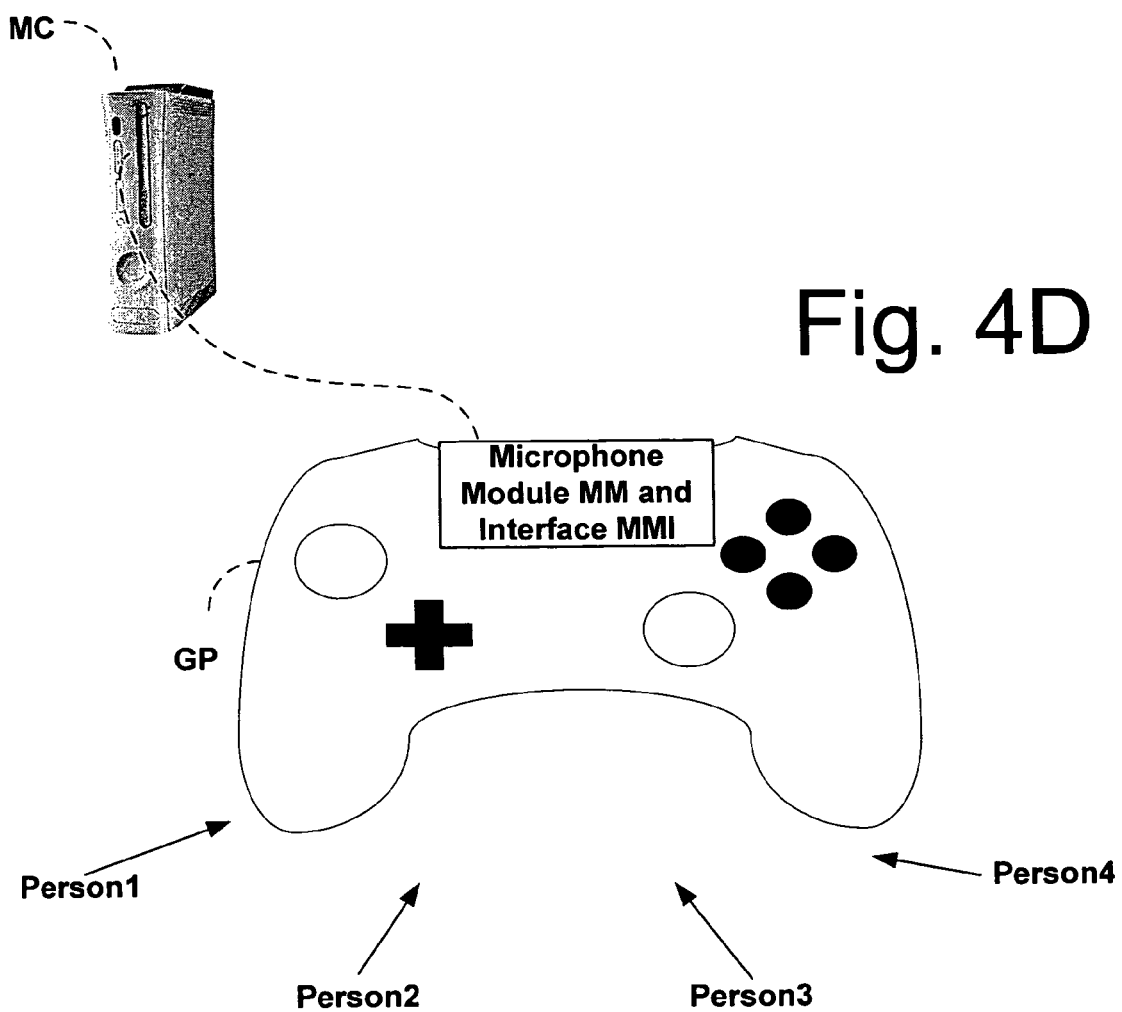

As can be appreciated, a microphone module in accordance with the invention may be integrated with, i.e., built into, a game controller, may be a module that itself interfaces with, i.e., plugs into, a game controller, or may be a module that attaches to a game controller via wired means, such as an extension cable (or wireless via Bluetooth or other wireless protocol). FIG. 4D illustrates an embodiment in which microphone module MM is built into (e.g., integrated with the electronics of) peripheral GP.

Figure 4E:
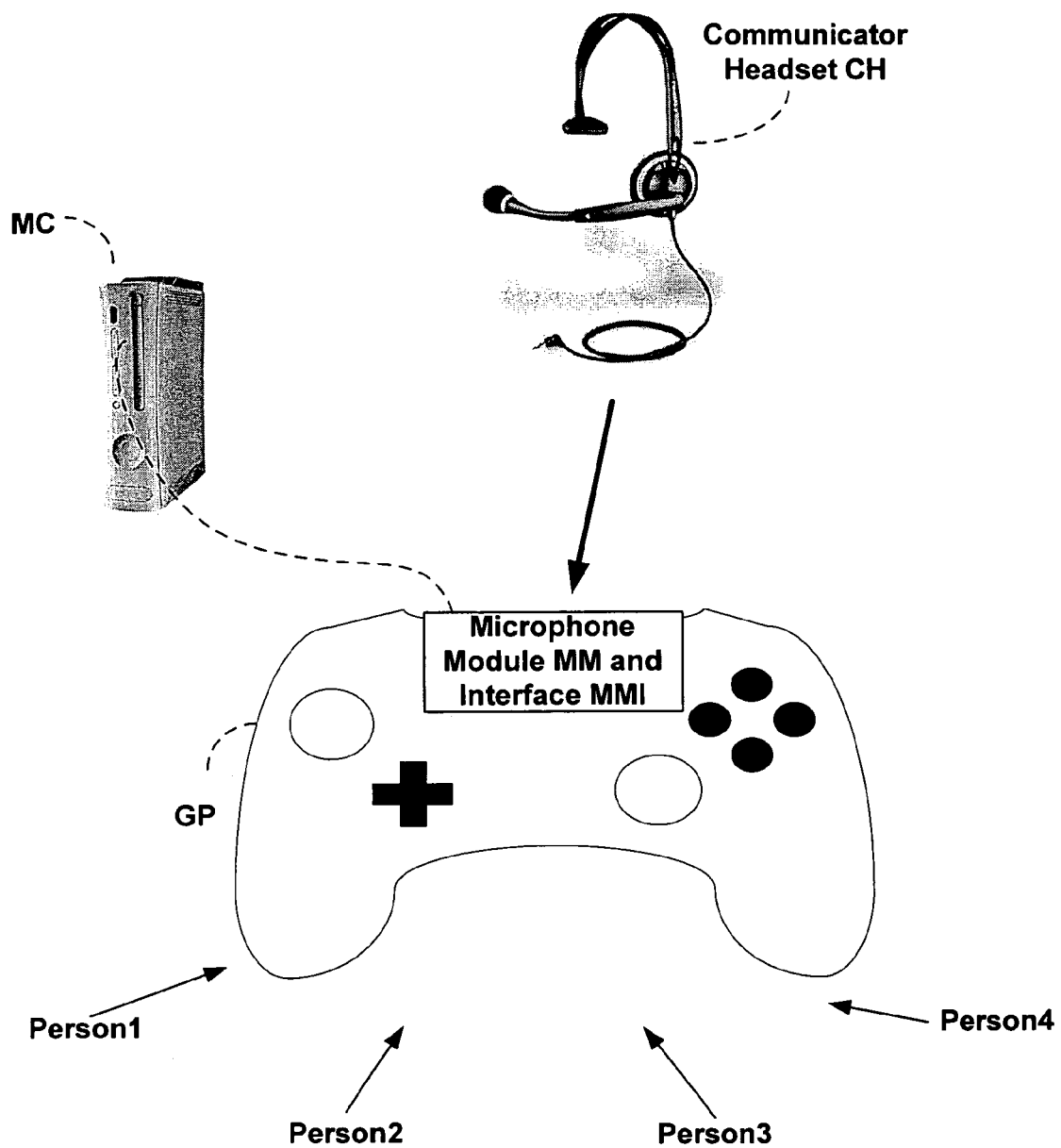

FIG. 4E illustrates a further embodiment of the invention in which it is possible to "pass-through" any embodiments of the microphone module MM described with a communicator headset CH. Thus, in such an embodiment, a user wishes to retain the person to person functionality described in the background with respect to headsets. Thus, in accordance with the invention, a traditional communicator headset CH may be connected to the microphone module MM, which disables or mutes the microphone element(s) in the microphone module MM automatically, and causes voice input to be handled by the communicator headset CH as the voice input data "passes through" the microphone module MM to the multimedia console MC via the peripheral GP. In exemplary non-limiting detail, a standard 2.5 mm audio jack may be provided on an end of the microphone module MM for such "pass-through" when a traditional headset is plugged into the 2.5 mm jack.

In still further embodiments of the invention, a detection circuit (or other software, hardware and/or firmware component) is included inside the controller that is used to detect whether a headset (microphone and earpiece), just a microphone is attached, or no microphone or earpiece is attached. The circuit can thus detect the presence or absence of a speaker, depending upon the scenario. In one embodiment, the detection circuit outputs three different voltages (three states) depending on whether there is nothing attached, a headset attached, or a microphone only attached. This output of the detection circuit goes to an analog to digital (A/D) input circuit. In one embodiment, the firmware of the game controller then signals the console based on which voltage (state) is detected.

Figure 5:
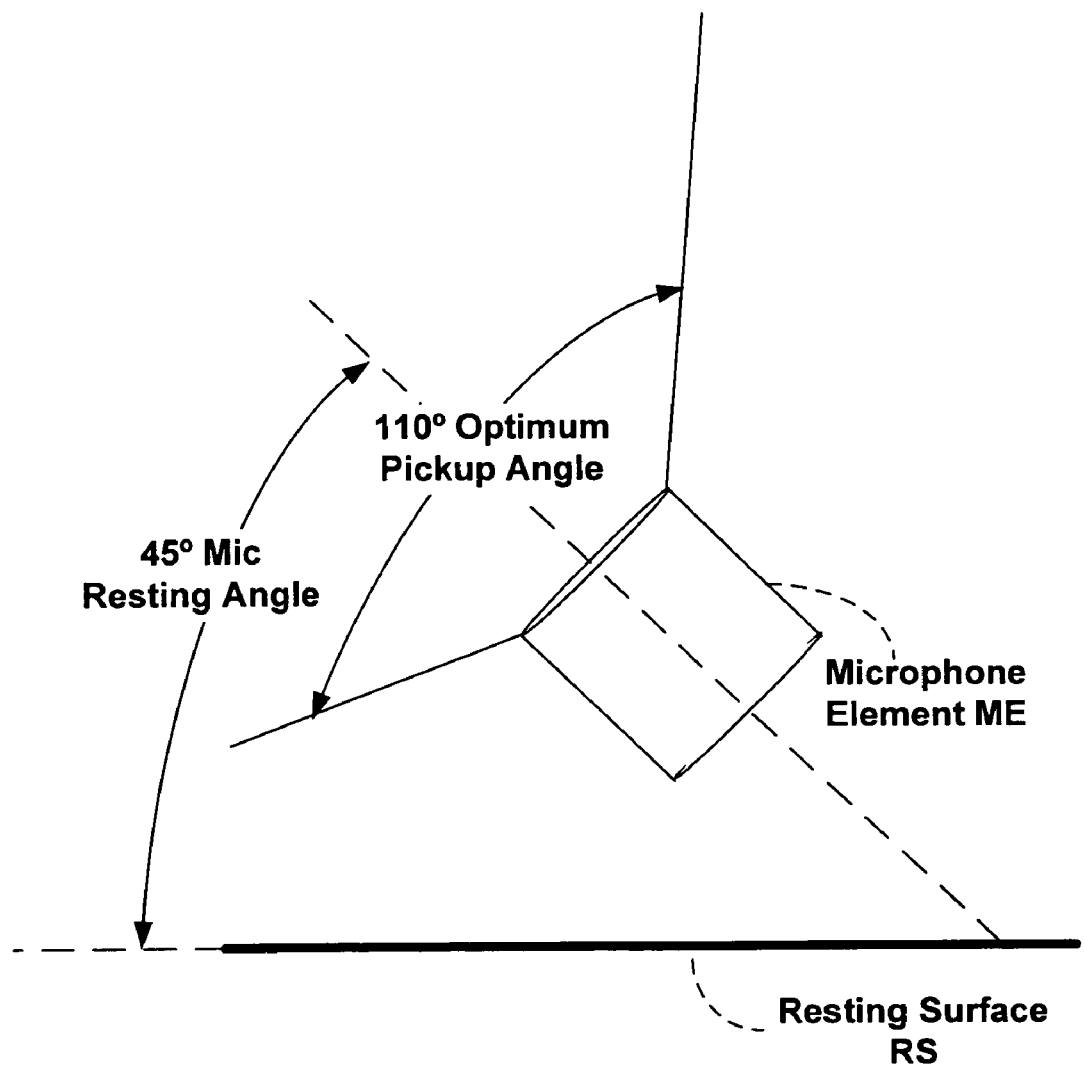
FIG. 5 illustrates a side view of exemplary non-limiting angling for microphone element(s) provided in accordance with the invention.

With respect to the microphone elements of the invention, as illustrated in FIG. 5, in one embodiment, once plugged into the controller (not shown), wherein the controller is positioned on an X-Y plane, the microphone main axis is oriented 45 degrees from a resting surface RS when resting, or when held parallel to the floor. Also, in exemplary non-limiting embodiments of the microphone element(s) ME in accordance with the invention, the design is such that the envelope of field of sound received by the microphone is defined approximately by a cone with angle at vertex (in any plane) in the range of 45-55 degrees. As shown, the angle is approximately 55 degrees, defining a cone for optimum pickup of about 110 degrees according to the side sectional view.

An embodiment of a microphone including a directional microphone element ME in accordance with presently preferred, but non-limiting design choices in accordance with the invention, is illustrated in FIG. 5. As illustrated, whether the microphone of the invention is integrated with a peripheral, such as a game controller, or is connected to the peripheral via wired or wireless means, when the microphone or game controller is placed on a resting surface RS, such as a table, chair or the like, or when the microphone is held generally parallel to the plane of the floor, the microphone element ME of the invention is provided at a 45 degree resting angle to the users of the microphone. Moreover, as illustrated the cone of sound pickup for the microphone element ME is generally selected to be approximately 110 degrees. Other applicable ranges for a resting angle may include 40 to 50 degrees, 35 to 55 degrees and 30 to 60 degrees, depending on the application. Similarly, other applicable ranges for the optimum pickup angle for a cone generally center around 110 degrees. For instance, ranges of 100 to 120 degrees, 90 to 130 degrees, or 80 to 140 degrees may provide a sufficient pickup angle depending upon the application for which the microphone is used.

Thus, as shown in exemplary fashion in FIG. 5, the noise cancellation design for microphones provided in accordance with the invention is mechanical and structural, by providing the microphone elements ME at pre-defined ranges of angles to optimize for the typical user of a peripheral of a multimedia console. Additionally, other known noise cancellation techniques, such as local echo noise cancellation, may be implemented for or by any of the microphone module of the invention.

With respect to directionality of the microphone elements, the microphone element(s) ME may be unidirectional. For instance, in one non-limiting embodiment, measured at 1 kHz, the relative response at 180 degrees (away from the user) is less than the response at 0 degrees. In one non-limiting example, the response is 15 dB less at 180 degrees than the response is at 0 degrees. In another non-limiting embodiment, the sensitivity of the microphone element(s) ME is set to −47 dB+/−4 dB at L=50 cm, wherein 0 dB=1V/Pa at 1 kHz. Exemplary signal to noise ratio, in one embodiment, is set to be at least 60 dB.

Secondary controls may also be provided in accordance with the microphone module of the invention to adjust the output volume on speakers, e.g., generally associated with a viewing device, such as a television, audio receiver device, or any other means for a user hearing the output sound from a game/communication system.

The invention thus provides various embodiments of a microphone module that connects to a peripheral, e.g., to the headset jack of a game controller. The microphone module may contain directional microphone element(s) that pick up voices from people near the game controller, but rejects background sounds from the room. User controls are available to set the microphone level (either manually or automatically) and mute/unmute the microphone. The microphone of the invention can be used on a wired or wireless game controller. When used with a wireless game controller, wireless microphone capabilities and freedom of movement are provided without headdress requirements imposed by headsets.

In one embodiment of the invention, in a manner similar as the embodiment shown in FIG. 4B, a small microphone can be worn by a user, e.g., lapel or pocket clip style, wherein the small microphone connects to a jack of the microphone module or peripheral.

In another embodiment of the invention, the microphone module is provided as a microphone puck is provided for a game controller, which may be used with camera-enabled game consoles. In still further embodiments, the microphone module, peripheral or multimedia console may include a state switch which governs how voice input is handled when received by the microphone module according to the various embodiments of the invention among the following states: recording a message, talking 1:1, 1:subset and 1:all. Such states correlate to recording a message, speaking to just one other user, e.g., via headsets, speaking to just a designated subset of other users and speaking to everyone.

Also, it can be appreciated that the various embodiments of the microphone module of the invention do not utilize earphones, such as provided with a headset, but rather contemplate that the audio output of the multimedia console will be heard via TV speakers, or other speakers, used to hear the typical output of an application environment being executed by the multimedia console. Thus, in various embodiments of the invention, the voice input may require reformatting or appropriate adjustment for the differences in outputting to earphones versus more sizable TV or other speakers.

Figure 6A:
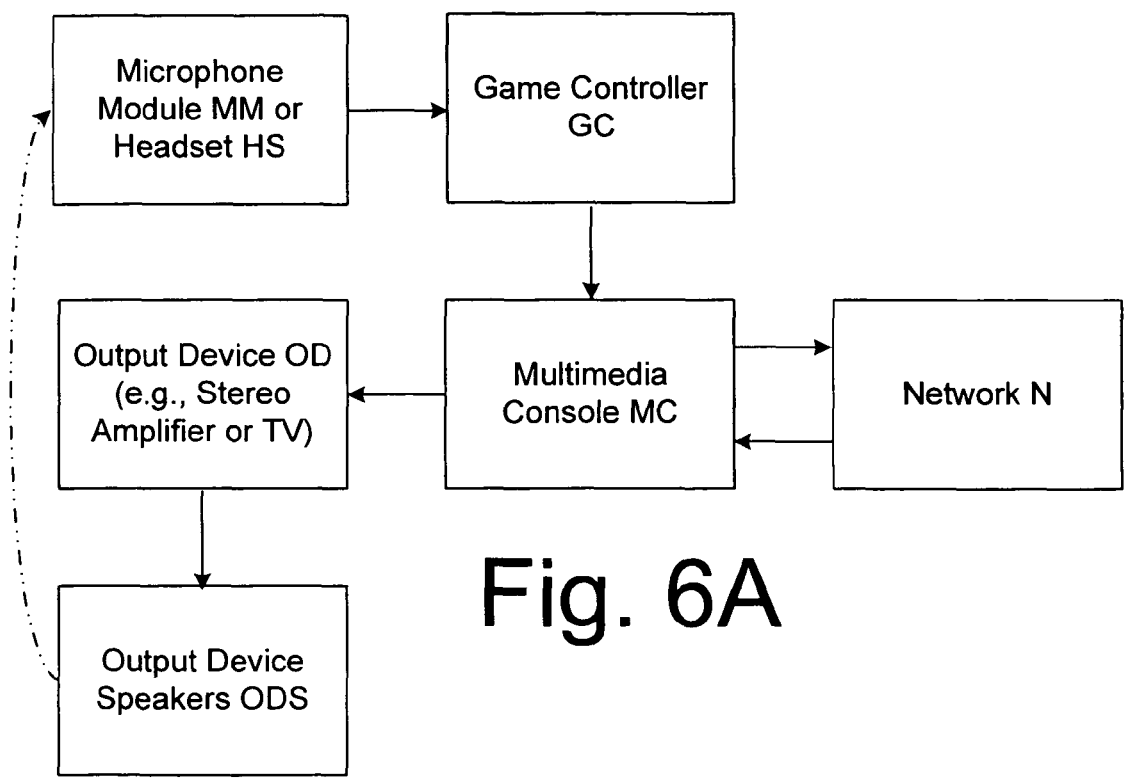
FIGS. 6A, 6B and 6C together illustrate exemplary non-limiting architectural block diagram(s) for a system utilizing embodiment(s) of voice input techniques according to the invention.
Figure 6B:
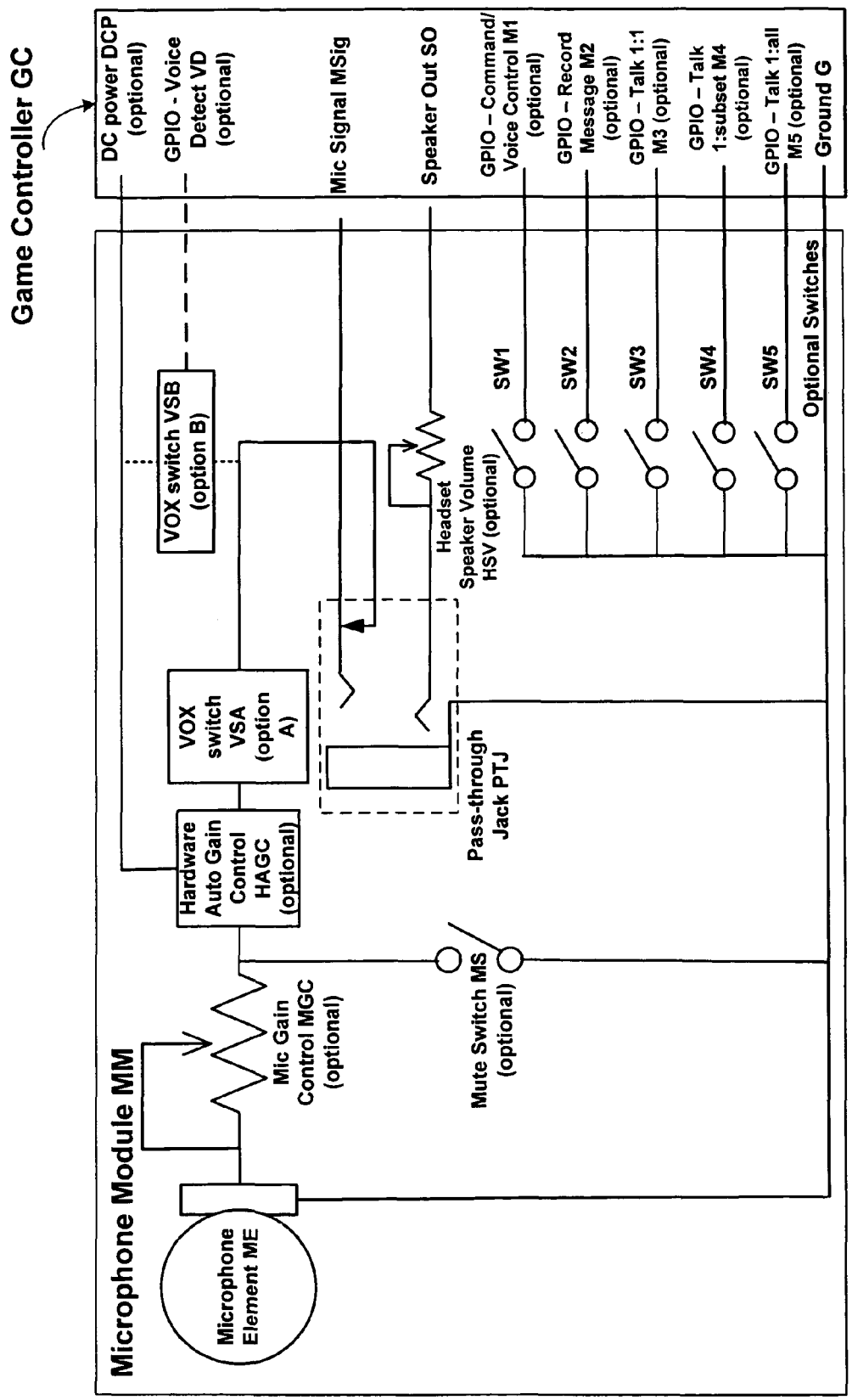
Figure 6C:
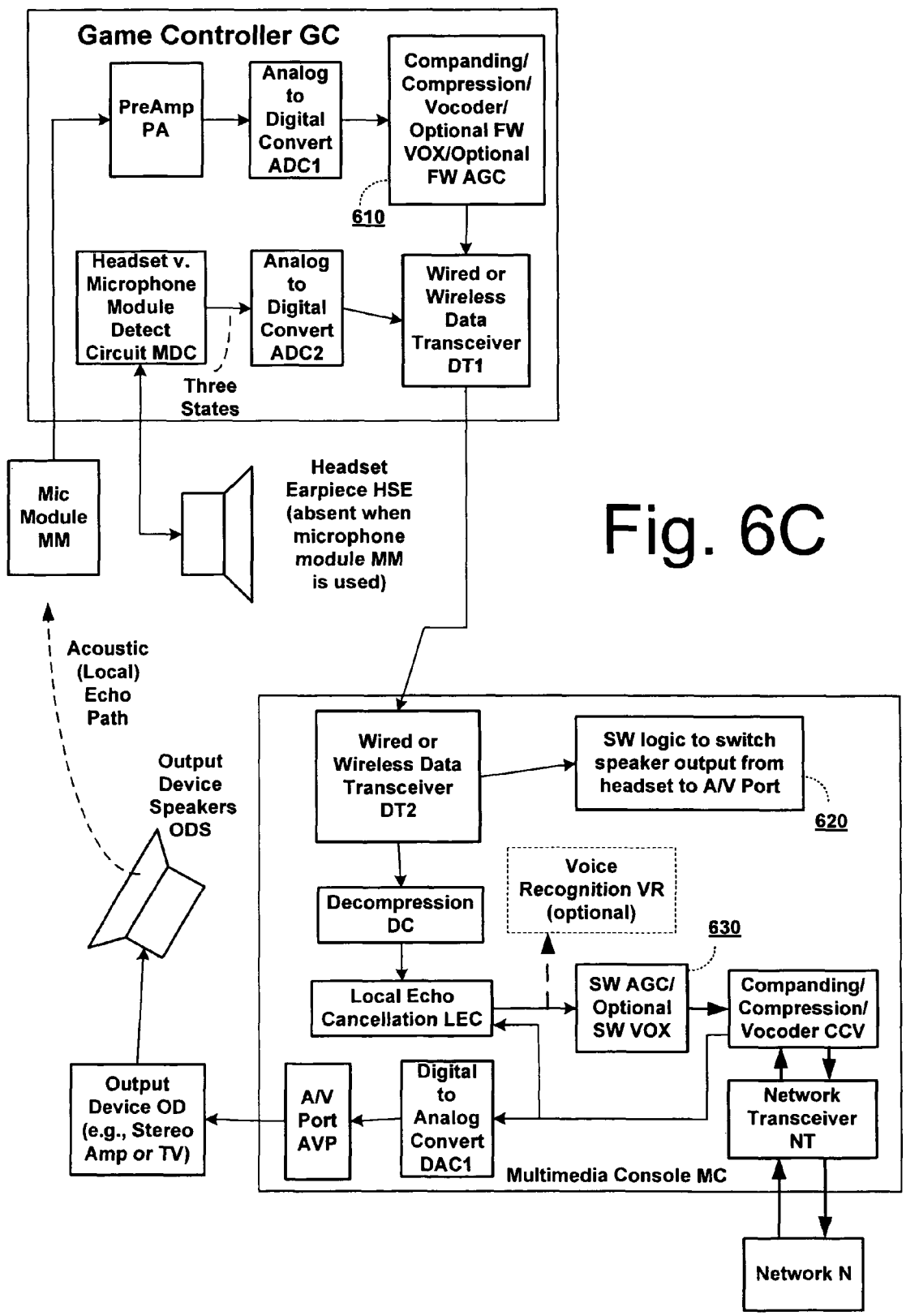

Exemplary, non-limiting architectural block diagram(s) for a system implementing one or more embodiment(s) of the invention, described herein, are illustrated in FIGS. 6A to 6C. In FIG. 6A, a microphone module MM (or headset HS) is communicatively coupled with a game controller GC as described herein. Game controller GC in turn is connected to multimedia console MC, which is in turn coupled to a network N for on-line game play, remote voice chat, etc. Multimedia console MC is also communicatively coupled to output device OD, such as a stereo amplifier and/or television, which may also include or be coupled to output device speakers ODS. As shown by the dashed/dotted arrow, output device speakers ODS may produce background noise which is undesirable to pick up by microphone module MM or headset HS, when a player is engaged in voice chat, or the like.

FIG. 6B illustrates an exemplary non-limiting block diagram of circuit elements or components that may be found in microphone module MM, provided in accordance with the invention, when connected to a game controller GC. For instance, microphone module MM may include one or more directional and/or omni-directional microphone element(s) ME communicatively coupled to optional microphone gain control MGC. A mute switch MS optionally may mute or unmute the signal picked up by the microphone element(s) ME. From microphone gain control MGC, an optional automatic gain control HAGC may alternatively or additionally be provided to automatically set the gain of the signal picked up by microphone element(s) ME. A VOX switch VSA and/or VSB may be applied to the output of the hardware gain control HAGC. DC power DCP is supplied to the microphone module MM from game controller GC. A pass through jack PTJ of the microphone module MM allows the signal to be output to the headset HS via speaker out SO, or passed to game controller GC via microphone signal MSig to pass to the multimedia console MC to pass to the network N. A voice detect VD may also be optionally included in game controller GC for determining the presence of voice.

A variety of optional switches SW1, SW2, SW3, SW4 and SW5 may be utilized for optional input/output to the peripheral GP for enabling or disabling a voice command mode, or a record message mode, a talk 1:1 mode, a talk 1:subset mode and/or a talk 1:all mode.

FIG. 6C shows an exemplary non-limiting block diagram illustrating a system in accordance with FIG. 6A in more detail. In FIG. 6C, game controller GC receives the output from microphone module MM by a preamplifier PA, an analog to digital converter ADC1, and then to compander, compressor, vocoder, optional FW VOX and optional FW automatic gain control 610. Concurrently, the game controller may also include a headset vs. microphone module detect MDC for detecting whether a headset (microphone+earpiece), microphone only, or no microphone or headset is present, as described above. The output of module detect MDC is converted to digital form by ADC2 and, along with the output from circuit 610, is sent to wired or wireless data transceiver DT1, which in turn transmits the signals to multimedia console MC via appropriate wired or wireless means.

The signals are received by wired or wireless data transceiver DT2 of multimedia console MC whereby switch logic 620 may be applied to switch speaker output from headset to the A/V port A/V port AVP, depending upon any information received from module detect MDC. The audio data received by transceiver DT2 is decompressed by decompression DC and local echo cancellation is applied by component LEC. Optional voice recognition VR may be applied next, and then any software automatic gain control, or optional software VOX algorithms may be applied by element 630. After (de)companding, (de)compressing, and/or (de)vocoding with component CCV, a network N exchange may take place via network transceiver NT in connection with, for example, an on-line game experience. Data received from the network N may then via return path be transformed into analog format by DAC1. Local echo cancellation component LEC also receives the signal that is output to DAC1 so that acoustic or local echo cancellation techniques can be performed with respect to the output of speakers ODS. Through A/V port AVP, the analog signal is output to output device OD (e.g., stereo amp or TV), which in turn outputs to speakers ODS of the OD. Speaker(s) ODS define an acoustic (local) echo path, whereby microphone module MM may pick up sound from the application running on the multimedia console MC. Such noise may be handled, for example, by local echo cancellation LEC.

As mentioned, FIGS. 6A to 6C were shown for exemplary purposes only, to illustrate some of the principles of the invention in design form, though it will be appreciated by one of ordinary skill in the art, that a variety of circuit forms, whether implemented in software, firmware or hardware, may be equivalent from an operational standpoint. As one of ordinary skill in the art can appreciate, in one aspect of the invention, the microphone module does not require push-to-talk action by the user to enable the microphone module, i.e., a user can simultaneously talk and listen according to the "always on" functionality offered by the invention. While push-to-talk functionality has been traditionally utilized to solve problems with noise cancellation, push-to-talk is limited because a user can either talk (when the button is pressed) or listen (when the button is not pressed) but not both, and thus the invention achieves advantages over such systems.

Exemplary Network Environment

The voice input and on-line experiences enabled by the invention may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes, or simulations thereof.

Figure 7:
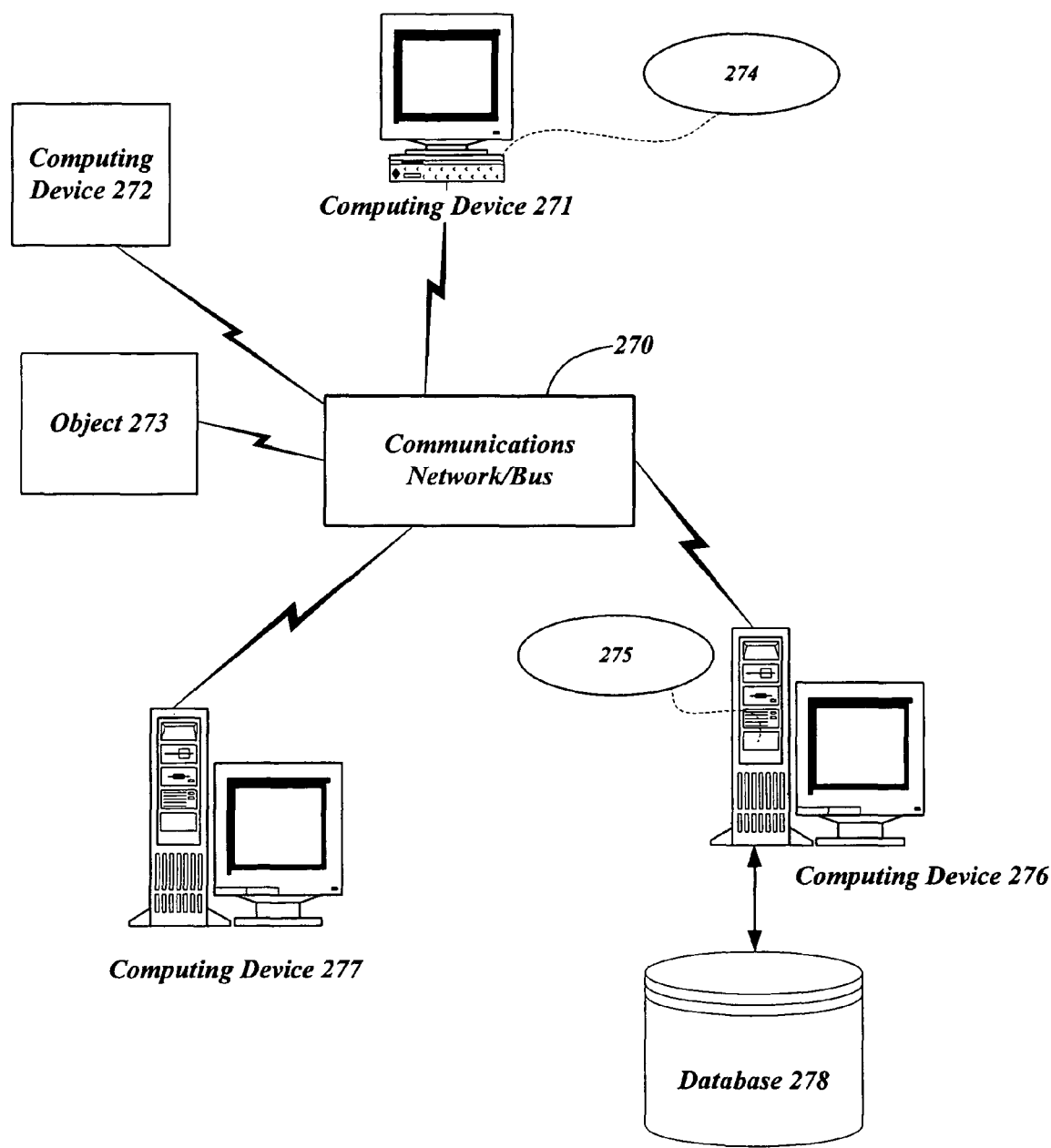
FIG. 7 illustrates an exemplary networked computing environment in which many computerized processes, including those of various aspects of the invention, may be implemented.

An exemplary networked computing environment is provided in FIG. 7. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 7 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 7, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

As the foregoing illustrates, the invention is directed to systems and methods for providing a system level user interface in a multimedia console. It is understood that changes may be made to the illustrative embodiments described above without departing from the broad inventive concepts disclosed herein. For example, while an illustrative embodiment has been described above as applied to a multimedia console, running video games, for example, it is understood that the invention may be embodied in other computing environments. Furthermore, while illustrative embodiments have been described with respect one to four users on the same console, embodiments having other numbers of users are also applicable. Also, any resemblance of figures herein to any commercial product is for differentiation purposes only, and not to imply any limitation of the devices shown except as described herein. Accordingly, it is understood that the invention is not limited to the particular embodiments disclosed, but is intended to cover all modifications that are within the spirit and scope of the invention as defined by the appended claims.

What is claimed is:

1. A peripheral for use with an on-line or networked application of a multimedia console used primarily for executing games and other multimedia applications in a multimedia console system, wherein the peripheral includes a microphone module and an interface for communicative coupling to the microphone module,
   wherein the microphone module includes at least one directional microphone element and at least one omnidirectional microphone element for receiving voice input from a user of the multimedia console, the at least one directional microphone element and the at least one omnidirectional microphone element operating so that the user is able to simultaneously send the voice input to another user of the multimedia console system and receive voice output from another user of the multimedia console system,
   wherein the interface is configurable to receive an indication from the user that the user wishes to switch operation between the at least one directional microphone element and the at least one omni-directional microphone element, and wherein the interface is further configurable to responsively switch operation of the microphone module without requiring the user to physically manipulate the microphone elements, and
   wherein the microphone module is configured to selectively operate in a chat mode in which the voice input is transmitted to at least one other person or in a command mode in which the voice input is interpreted as command data for the multimedia console system.

2. A peripheral according to claim 1, further including a detection component for detecting whether a headset, microphone only, or no headset or microphone is present, and outputting at least one signal based on said detecting.

3. A microphone module for use with an on-line or networked application of a multimedia console system used primarily for executing games and other multimedia applications, the microphone module including:
   at least one directional microphone element and at least one omnidirectional microphone element for receiving voice input from at least one user of the multimedia console system, wherein the at least one directional microphone element and the at least one omnidirectional microphone element operate in an unmuted mode continuously without requiring push-to-talk action from the user of the multimedia console system that interrupts the operation of the at least one directional microphone element and the at least one omnidirectional microphone element,
   an interface configurable to receive an indication from the user that the user wishes to switch operation between the at least one directional microphone element and the at least one omni-directional microphone element, and wherein the interface is further configurable to responsively switch operation of the microphone elements without physically manipulating the microphone elements;
   a mute control communicatively coupled to the at least one directional microphone element and the at least one omnidirectional microphone element for selectively muting the at least one directional microphone element and the at least one omnidirectional microphone element;
   a microphone gain control communicatively coupled to the at least one directional microphone element and the at least one omnidirectional microphone element and configured to adjust a gain level associated with the voice input; and
   an automatic gain control circuit communicatively coupled to the microphone gain control and configured to automatically set a gain of a signal received by the at least one directional microphone element and the at least one omnidirectional microphone element.

* * * * *